United States Patent
Arimura et al.

(10) Patent No.: US 7,142,692 B2
(45) Date of Patent: Nov. 28, 2006

(54) REPRODUCTION EQUIPMENT, REPRODUCTION EQUIPMENT SPECIFYING EQUIPMENT, REPRODUCTION EQUIPMENT SPECIFYING SYSTEM AND METHODS AND RECORDING MEDIA FOR SAID EQUIPMENT AND SYSTEM

(75) Inventors: Koji Arimura, Fukuoka-ken (JP); Hisashi Inoue, Fukuoka (JP); Kenichi Noridomi, Fukuoka (JP); Takashi Katsura, Fukuoka (JP); Shinya Kadono, Nishinomiya (JP); Kazuhiko Nakamura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 656 days.

(21) Appl. No.: 09/941,931

(22) Filed: Aug. 29, 2001

(65) Prior Publication Data
US 2002/0076082 A1  Jun. 20, 2002

(30) Foreign Application Priority Data
Sep. 1, 2000 (JP) .................. 2000-264979

(51) Int. Cl.
*G06K 9/00* (2006.01)
(52) U.S. Cl. .................... 382/100; 713/176
(58) Field of Classification Search .......... 382/100, 382/232, 233, 278; 348/469; 713/176
See application file for complete search history.

(56) References Cited

U.S. PATENT DOCUMENTS

| 4,885,632 A | * | 12/1989 | Mabey et al. ............. 725/20 |
| 5,636,292 A | * | 6/1997 | Rhoads ..................... 382/232 |
| 5,739,864 A | | 4/1998 | Copeland |
| 6,246,802 B1 | * | 6/2001 | Fujihara et al. ............. 382/276 |
| 6,553,127 B1 | * | 4/2003 | Kurowski ................... 382/100 |

FOREIGN PATENT DOCUMENTS

| CN | 1244676 A | 2/2000 |
| EP | 0 859 503 A2 | 8/1998 |
| EP | 0 903 943 A2 | 3/1999 |
| EP | 0 967 783 A2 | 12/1999 |
| JP | 10289522 | 10/1998 |
| JP | 11144380 | 5/1999 |

* cited by examiner

*Primary Examiner*—Samir Ahmed
*Assistant Examiner*—Craig W. Kronenthal
(74) *Attorney, Agent, or Firm*—Darby & Darby (57) ABSTRACT

A reproduction equipment converts an identification code of the reproduction equipment into a plurality of signal sequences using a correspondence table and embeds the obtained plurality of signal sequences in AV signals as a digital watermark. A reproduction equipment specifying equipment compares correlation values of the AV signals, containing the digital watermark embedded therein with all signal sequences contained in a correspondence table. A comparison of the correlation values with a previously set threshold value determines the embedded signal sequences and the identification code of the reproduction equipment which may be extracted.

16 Claims, 8 Drawing Sheets

| bit position : j | signal series |
|---|---|
| 1 | N 1 |
| 2 | N 2 |
| 3 | N 3 |
| ⋮ | ⋮ |
| m | N m |

Fig. 7 m : code length of identification code

REPRODUCTION EQUIPMENT, REPRODUCTION EQUIPMENT SPECIFYING EQUIPMENT, REPRODUCTION EQUIPMENT SPECIFYING SYSTEM AND METHODS AND RECORDING MEDIA FOR SAID EQUIPMENT AND SYSTEM

BACKGROUND OF THE INVENTION

1. Field of the Invention

This invention concerns reproduction equipment for AV. In the present specification, the term "AV" signals refers to either audio or video or both audio and video (the form in which these coexist is arbitrary). To be more specific, the invention concerns an art of embedding an identification code, etc., which specifies a reproduction equipment, as a digital watermark in AV signals (reproduced signals) output from the reproduction equipment.

This invention also concerns equipment which specifies the reproduction equipment, which extracts a digital watermark from reproduced AV signals, and which specifies the reproduction equipment that produced the AV signals (reproduced signals).

In the present Specification, "reproduction equipment" refers not just to equipment that have only the function of reproducing AV signals from a recording medium but refers inclusively to equipment having both the function of reproduction and the function of recording AV signals in a recording medium.

2. Description of the Related Art

Recently, it has become possible to record and reproduce AV data in various forms. AV data can be recorded and reproduced as analog signals, as in the case of VHS, or recorded and reproduced as digital signals, as in the case of DVD.

Also, the AV data may consist of just audio signals or video (moving pictures or still pictures) signals and can be recorded and reproduced as analog signals or digital signals.

This invention can be applied to AV data of the various abovementioned signal forms.

In particular, digital contents (AV data in the form of digital signals) have come to be used widely recently.

Regardless of whether the data that are recorded and reproduced as AV data take on an analog or digital form, if the data have the property of being an authored work, the copyright thereof must be protected. The prohibition of illegal copies is especially important.

Although AV data that take the form of analog signals can be copied, the degradation of quality (sound quality or picture quality, etc.), with each generation, cannot be avoided when copying is performed. It can thus be said that excessive copying of analog AV data cannot be performed readily.

However, quality degradation from copying does not occur at all with digital contents. In other words, a copy that is exactly the same as the original is easy to make.

Since illegal copies of contents (or contents that originate from such contents and are distributed) cannot be distinguished from the original, it is difficult to provide evidence that proves their illegality. The establishment of technical methods that enable effective protection of copyrights is thus being demanded.

The use of "digital watermarks" is being examined as such a method.

A "digital watermark" consists of data that are embedded in AV data in a manner that is imperceptible to a viewer or listener and are devised so that the digital watermark can be extracted from the AV data in which it is embedded.

Copyright information (for example, the name of the copyright holder, date of copyright, etc.) are embedded in AV data as a watermark for protection of the copyright.

By extracting the embedded digital watermark (copyright information) from AV data that are suspected to have been copied illegally, the copyright holder, etc. of the contents are clarified and the illegality of a copy is exposed. In such a manner, digital watermarks are intended to prevent illegal copies.

Specific techniques for embedding a watermark in AV data are described in detail, for example in "The Fundamentals of Digital Watermarks—A New Protection Technology for Multimedia" by Kashio Matsui (Morikita Publishing, 1998), etc.

Japanese patent publication No. 2982768 also discloses the prevention of illegal copying of contents by embedding a digital watermark in AV signals.

In the art described by this literature, an illegal copy prevention control signal is embedded in advance as a digital watermark in the AV signals.

Extraction of the illegal copy prevention control signal from the AV signals is then performed during the reproduction of the AV signals. If the copy prevention signal has been extracted turns out to be illegal, noise is added anew as a digital watermark.

Thus each time an illegal copy of a recording medium, prepared based on the above art is viewed or listened to, noise is added to the AV signals. This degrades the quality (sound quality of visual quality) of the AV signals each time the signal is reproduced or copied. Eventually, such a large amount of noise is added to the AV signals that viewing and listening is impossible. As a result, illegal copying in multiple generations is prevented.

OBJECTS AND SUMMARY OF THE INVENTION

With the prior art, the reproduction equipment that was used for copying cannot be specified. This is because, with the prior art, the digital watermark that is embedded in the AV signals is, for example, the name of the author, random noise without meaning, etc. The embedded information has no relationship to the reproduction equipment. Even if the digital watermark discloses the name of the author, this information is of no practical use unless proof can be obtained of the fact that illegal copying was performed.

If the reproduction equipment that was used for copying can be specified, it can be claimed with a high degree of certainty that the owner or user of the reproduction equipment was involved in illegal copying. However, the prior art is incapable of providing this information.

Illegal copying therefore cannot be restrained effectively by the prior art.

A first object of this invention is to provide an art which can specify the reproduction equipment used for copying.

Generally in extracting the embedded digital watermark in accordance with the abovementioned literature, the values of correlation between all noise strings used in embedding and the signals in which the digital watermark is embedded are determined and the noise string that exhibits the greatest correlation value is extracted as the embedded noise string. However, if the embedded noise string is selected arbitrarily, there may be a noise string that exhibits a high correlation value by chance. In this case, the embedded noise string cannot be extracted accurately.

A second object of this invention is to provide an art by which the embedded digital watermark can be extracted with high precision.

In some cases, people who illegally copy AV signals intentionally disable the extraction of the information embedded as a digital watermark. For example, the signal sequence is interchanged or a part of the signals is removed. When such processing is performed, the embedded digital watermark cannot be extracted correctly by the prior art.

A third object of this invention is to provide an art by which a digital watermark can be extracted without fail even when a third party processes the AV signals.

In some cases, people who perform illegal copying analyze the embedded information or embedding method and intentionally embed a false digital watermark. With the prior art, the protection of the copyright is insufficient when a third party is successful in analyzing the embedded information.

A fourth object of this invention is to provide an art that contains a countermeasure for cases where a third party is successful in analyzing the digital watermark.

A first mode of this invention provides a reproduction equipment comprised of a digital watermark generating means, which generates, as a digital watermark, attribute information that enables the identifying the reproduction equipment, a digital watermark embedding means, which generates watermark-embedded AV signals with which the digital watermark generated by the digital watermark generating means is embedded in AV signals, and an output means, which outputs the watermark-embedded AV signals to the exterior.

With the above arrangement, a reproduction equipment that was used for illegal copying can be identified specifically by means of the digital watermark that is extracted from illegally copied AV signals. That the owner, etc. of the identified reproduction equipment has been involved in illegal copying can thus be claimed. A system for copyright protection can thus be established to prevent illegal copying.

With a second mode of this invention, a reproduction equipment identification code is converted into a plurality of signal sequences using a correspondence table in the reproduction equipment. The plurality of signal sequences obtained are embedded as a digital watermark in the AV signals during reproduction. With a reproduction equipment specifying equipment, the values of correlation between the AV signals in which the digital watermark was embedded and all of the signal sequences contained in the correspondence table are determined and compared with a previously set threshold value to determine the embedded signal sequences. The identification code of the reproduction equipment is extracted using a plurality of signal sequences obtained from AV signals of at least a fixed length of time T.

With this arrangement, the identification code of the reproduction equipment used-in the copying process can be extracted from the illegally copied AV signals to enable detection and prevention of illegal copying.

With a third mode of this invention, the signal sequences with which the cross correlation values are smaller than a previously set value (threshold value of cross correlation) are used as the signal sequences to be embedded.

With this arrangement, the precision of extraction of the embedded signal sequences by the reproduction equipment specifying equipment is improved and the precision of extraction of the identification code is improved. Identification of the reproduction equipment is thus enabled.

With a fourth mode of this invention, a plurality of signal sequences are embedded randomly by the reproduction equipment so that they will be embedded at the same proportion per fixed time T.

With this arrangement, even where people that perform illegal copying perform the process of extracting parts of the AV signals at fixed intervals, the identification code can be extracted without fail from the illegally copied AV signals to enable identification of the reproduction equipment.

With a fifth mode of this invention, the identification code is converted into a bit string. A signal sequences corresponding to the "1"s or the "0"'s of the bit string are embedded by the reproduction equipment. The order of the embedded signal sequences does not require a meaning.

With this arrangement, even where people that perform illegal copying change the temporal sequence of the AV signals, the identification code can be extracted without fail from the illegally copied AV signals to enable identifying of the reproduction equipment.

With a sixth mode of this invention, the contents of the correspondence table that are held in the reproduction equipment and the reproduction equipment specifying equipment are changed to be always the same by means of a correspondence table changing signal.

With this arrangement, even in the case where the embedded signal sequences are leaked to a third party, new signal sequences can be embedded by changing the correspondence table to enable identifying of the reproduction equipment.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
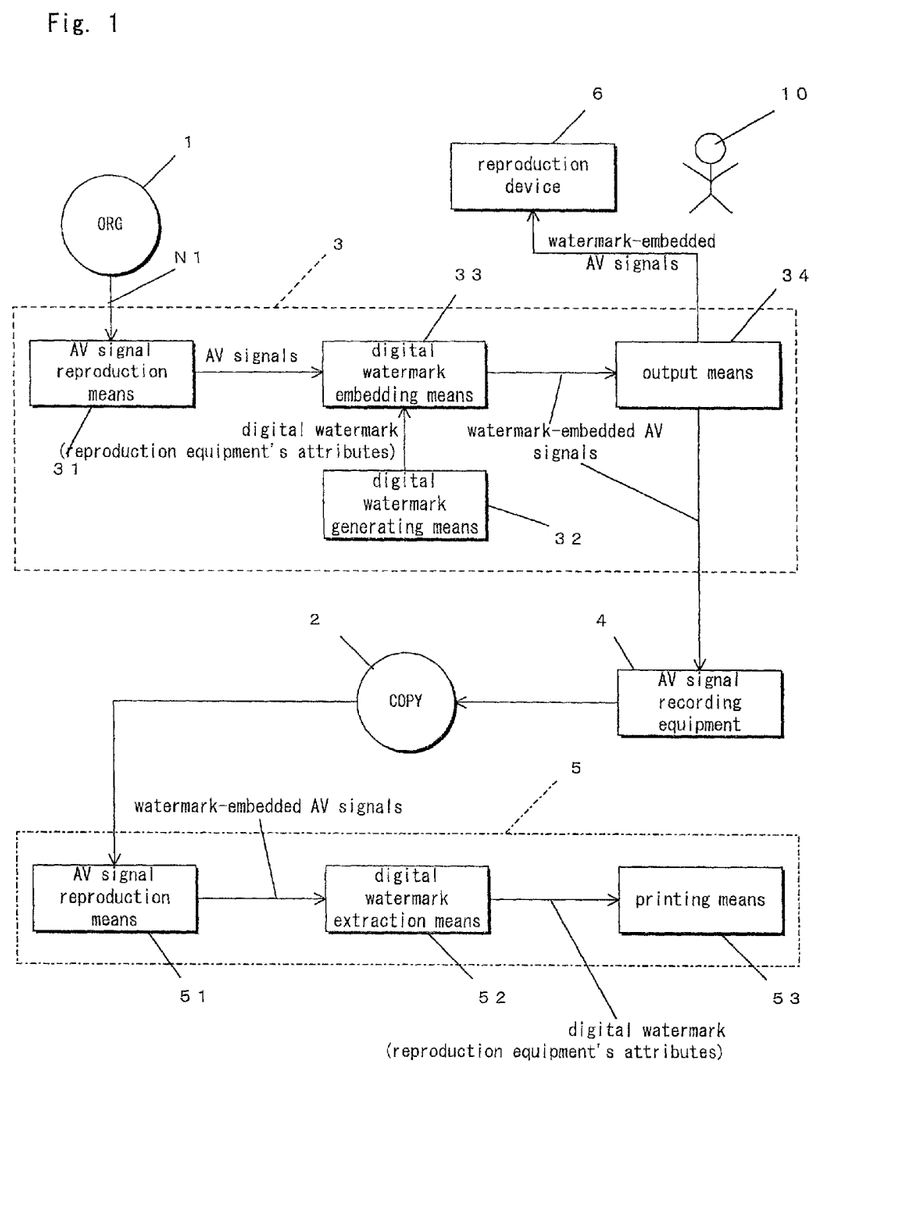
FIG. 1 is a block diagram of a reproduction equipment specifying system of an embodiment of this invention.

Referring to FIG. 1 a reproduction equipment specifying system of the embodiment of this invention includes a reproduction equipment 3 having an AV reproduction means 31. AV reproduction means 31 is of a type capable of reproducing AV data moving in a direction N1 from an original recording medium 1. The AV signals from AV signal reproduction means 31 are applied to a digital watermark embedding means 33. A digital watermark generating means 32 applies a digital watermark to digital watermark embedding means 33. The digital watermark indicates attribute information by which the recording equipment 3 can be specified. The method of generating the digital watermark may be any conventional method, such as that described in the book introduced in the section on the related arts. What is important is that reproduction equipment 3 can be specified by this attribute information.

The resulting watermark-embedded AV signals are applied to an output means 34. Output means 34 applies the watermark-embedded AV signals to a reproduction device 6 and to an AV signal recording equipment 4. A copier 10 reproduces the data on original recording medium 1 using the output of reproduction equipment 3. In addition, AV signal recording equipment 4 duplicates the performance of illegal copying onto a copy recording medium 2.

Copy recording medium 2 is then available as physical evidence of the illegal copying performed by copier 10 (represented by a stick figure of the person doing the copying).

A reproduction equipment specifying equipment 5 is used to prove the fact that copy recording medium 2 was prepared by copying using reproduction equipment 3. Reproduction equipment specifying equipment 5 includes an AV signal reproduction means 51 which receives the copied output of copy recording medium 2. The output of AV signal reproduction means 51 is watermark-embedded AV signals which are applied to a digital watermark extraction means 52. Digital watermark extraction means 52 derives the embedded digital watermark from the watermark-embedded AV signals, and applies the resulting digital watermark to a suitable reproduction device such as, for example, a printing means 53 for printing the digital watermark on paper. Printing means 53 may be any convenient human-understandable device such as, for example, a computer monitor, TV display. In some applications, a combination of display for immediate review, and a permanent printed record may be desired.

It is assumed in the following that copier 10 does not have a copyright for recording medium 1 and that copier 10 can be identified as an owner or user of reproduction equipment 3.

The form of the signal in original recording medium 1 and copy recording medium 2 is arbitrary and may be either analog or digital. The form of recording medium of recording medium I and copy recording medium 2 is also arbitrary and may be selected freely from among disks, tapes, hard disks, etc.

In general, reproduction equipment 3 may be of a type that is distributed in large numbers in the market while reproduction equipment specifying equipment 5 is generally owned by an organization that controls the copyright for recording medium 1 or by the police or other authority that exercises control over copyright violations.

Although, for purposes of illustration, reproduction equipment 3 and reproduction equipment specifying equipment 5 are shown at the same location, reproduction equipment 3 and reproduction equipment specifying equipment 5 normally exist in separate locations. Usually, these equipments also differ in their time of use.

With the system of this invention, illegal copying by copier 10 can be proven by the process to be described below.

With the system shown in FIG. 1, when copier 10 performs illegal copying, copier 10 sets original recording medium 1 in reproduction equipment 3, connects reproduction equipment 3 to AV signal recording equipment 4 with a cable, etc., and sets copy recording medium 2 in AV signal recording equipment 4.

Copier 10 also connects reproduction equipment 3 or AV signal recording equipment 4 to a reproduction device 6 to monitor the AV signals.

If the AV signals contain both sound and images, reproduction device 6 may be television equipment. If the AV signals contain only sound, reproduction device 6 may be an amplifier and speaker (or headphone), etc.

As was mentioned above, the AV signals may be either analog or digital signals, and a reproduction device 6 that is compatible with the form of AV signals used will be used.

If copier 10 considers monitoring to be unnecessary, reproduction device 6 may be omitted.

Even if copier 10 monitors the AV signals using reproduction device 6, since the digital watermark data are embedded in the AV data in a manner that is imperceptible to the viewer or listener as was mentioned above, copier 10 cannot normally notice that a digital watermark is being embedded in the monitored AV signals.

The present invention does not degrade the quality of AV signals by the digital watermark as in the prior art described in the abovementioned patent publication. Thus if copier 10 simply monitors the AV data recorded in recording medium 1 without performing illegal copying, the monitored AV signals will retain good quality.

This invention thus excels over the art of the abovementioned patent publication in the point that good quality is maintained as long as only legitimate monitoring is performed.

It can be readily understood that, when it is clear that the digital watermark extracted from copy recording medium 2 indicates attribute information unique to reproduction equipment 3, the suspicion that copier 10, whose connection as the owner, etc. of reproduction equipment 3, is involved in the illegal preparation of copy recording medium 2 becomes provable.

Thus with this invention, by embedding attribute information unique to reproduction equipment 3 as a digital watermark in the reproduced AV signals, the copyright of recording medium 1 can be protected effectively.

From the standpoint of copier 10, since copier 10 cannot perceive that a digital watermark is being embedded even if he/she monitors the AV signals on means of reproduction device 6, the evidence of illegal copying is inscribed in copy recording medium 2 without the knowledge of copier 10.

A copier 10 who comes to know of these circumstances will thereafter be discouraged to perform illegal copying heedlessly due to his/her understanding of the likelihood of exposure of participation in the illegal deed.

This invention can thus restrain illegal copying.

A representative form of coded AV signals is now taken up as an example of the AV signals recorded in recording medium 1 and a preferable embodiment for this type of AV signals is now described in detail.

Figure 2:
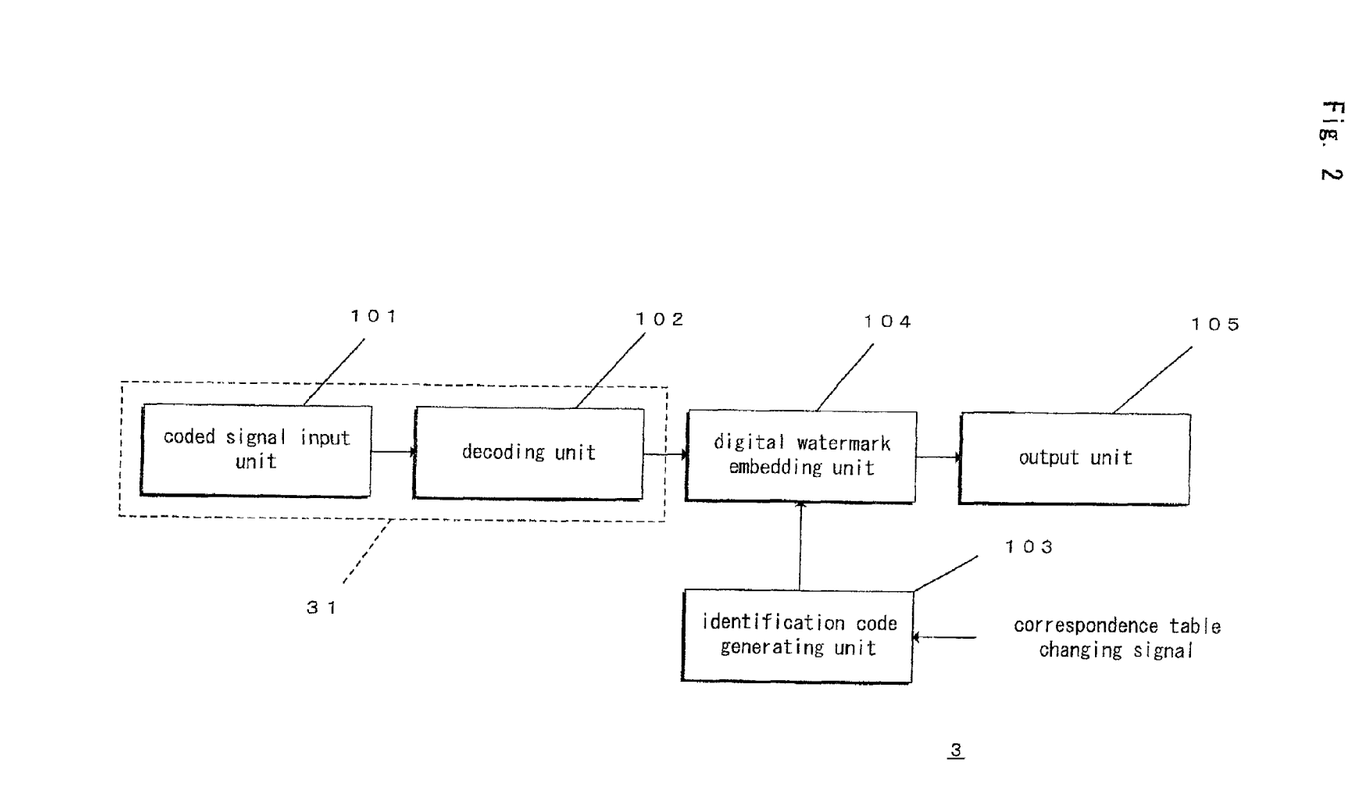
FIG. 2 is a block diagram of the reproduction equipment of the invention.

Referring to FIG. 2, AV reproduction equipment 3 includes AV reproduction means 31, as previously described. AV reproduction means 31 includes a coded signal input unit 101 which feeds a coded signal to a decoding unit 102.

An identification code generating unit 103 receives the output of decoding unit 102. An identification code generating unit 103 applies its output to digital watermark embedding unit 104. The output of digital watermark embedding unit 104 is applied to the input of an output unit 105. Identification code generating unit 103 receives a correspondence table changing signal whose nature and function is described in detail later in this specification.

With the present example, the coded signal input unit 101 and decoding unit 102 correspond to being the AV signal reproduction means 31 of FIG. 1. Also, the identification code generating unit 103 corresponds to being the digital watermark generating means 32, digital watermark embedding unit 104 corresponds to being the digital watermark embedding means 33, and output unit 105 corresponds to being the output means 34.

Figure 3:
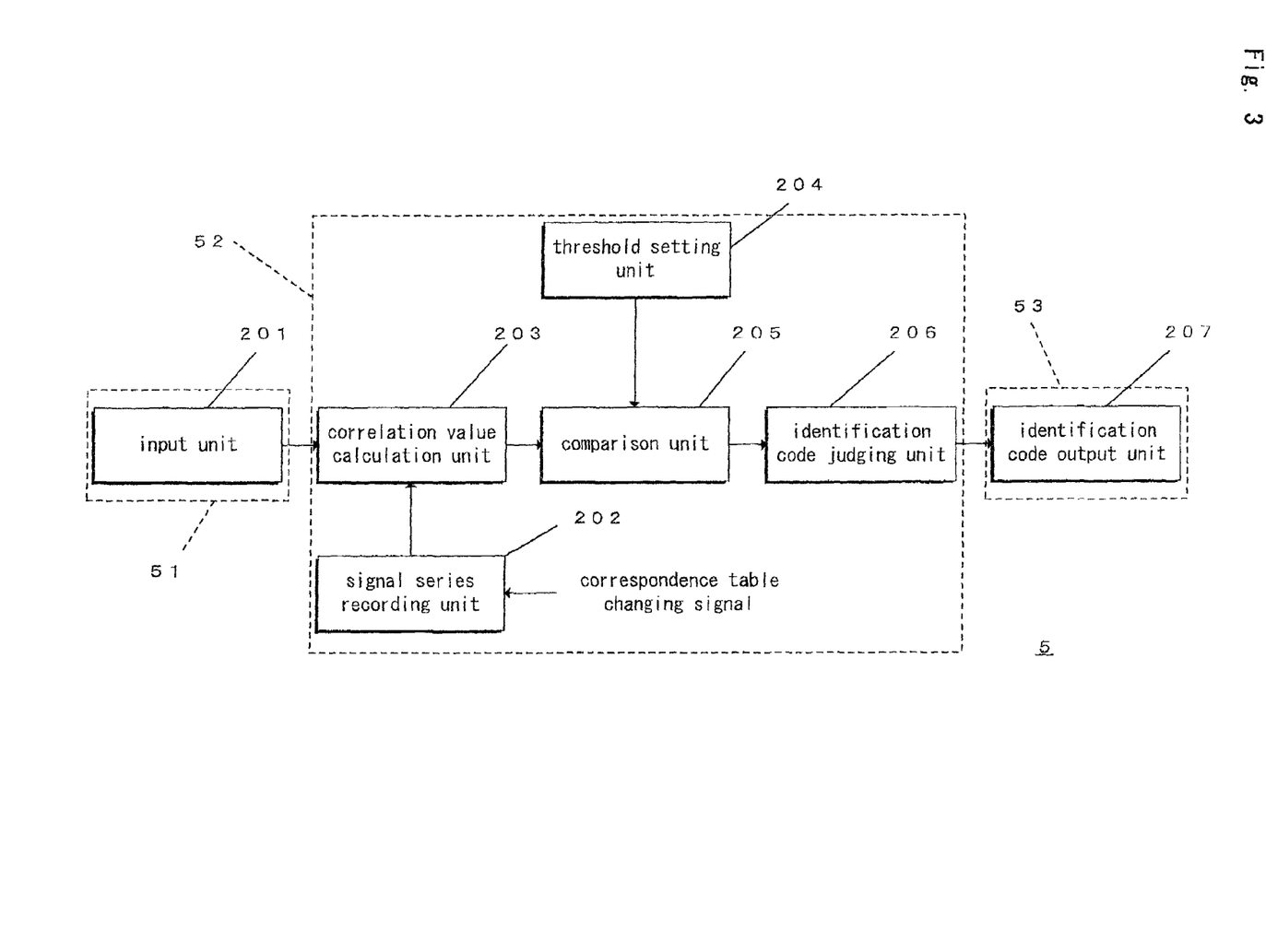
FIG. 3 is a block diagram of the reproduction equipment specifying equipment of the invention.

Referring now to FIG. 3, AV signal reproduction means 51 contains an input unit 201 which feeds its output to a correlation value calculation unit 203 in watermark extraction means 52. A signal sequences recording unit 202 feeds its output to correlation value calculation unit 203. Signal sequences recording unit 202 receives a correspondence table changing signal, to be described later. The output of correlation value calculation unit 203 is fed to an input of a comparison unit 205. The output of comparison unit 205 is applied to an input of an identification code judging unit 206. The output of identification code judging unit 206 is fed to an identification code output unit 207 in printing means 53.

With the present example, input unit 201 corresponds to the AV signal reproduction means 51 of FIG. 1, the signal sequences recording unit 202, correlation value calculation unit 203, threshold value setting unit 204, comparison unit 205, and identification code judgment unit 206 correspond to the digital watermark extraction means 52, and identification code output unit 207 corresponds to the printing means 53.

The correlation value calculation unit 203 determines correlation values S(k) defined as follows:

$$S(k) = \Sigma(Xi \times Ni(k)) \ (i=1, 2, \ldots, I)$$

where: X: the AV signal sequences that is input

Figure 4:
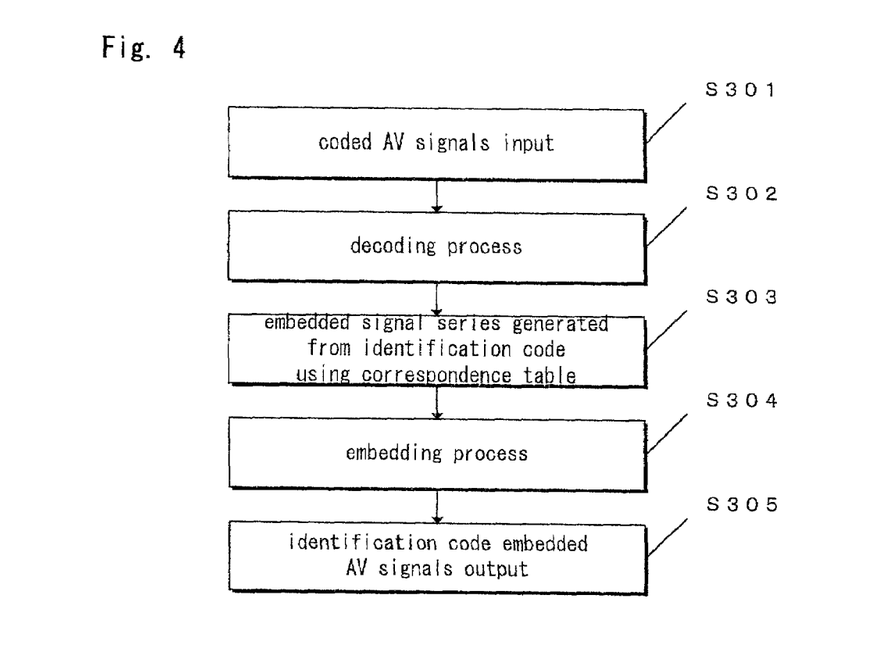
FIG. 4 is a flowchart for the reproduction equipment of the invention.

N: all of the signal sequences in the correspondence table; e.g. N(k) k=1, 2, . . . , m m: the number of signal sequences in the correspondence table The reproduction method by which an identification code is embedded as a digital watermark in the AV signals is now described with reference to the flowchart of FIG. 4 which illustrates the process performed by the reproduction equipment of FIG. 2 in embedding the identification code as a digital watermark.

Coded signal input unit 101 acquires a coded AV signals by readout from a recording medium (for example, a DVD, DV, HDD, etc.), receiving of a broadcast, or downloading from a network (for example, the Internet). Coded signal input unit 101 sends the coded AV signals to decoding unit 102 (step 301). Decoding unit 102 then decodes the coded AV signals in accordance to the rules of compression, transmission protocol, etc. and generates base-band AV signals (step 302).

The process of identification code generating unit 103 (step 303) is now described with reference to the flowchart of FIG. 5, which illustrates the flow of the process performed by identification code generating unit 103.

Identification code generating unit 103 prepares, as attribute information unique to the reproduction equipment, an identification code from or by combining the equipment ID of the reproduction equipment, the card ID of an IC card connected to the reproduction equipment, the user ID of a user, the raw material ID of the AV signals, the medium ID of the recording medium in which the AV signals are stored, and the reproduction date and time (step 401).

For example, the equipment ID of the reproduction equipment is set to "152". In this example, the number "152" is used as the identification code.

This identification code is then converted into a binary bit string consisting of "0"s and "1"s (step 402). When the equipment code "152" is converted into a bit string, it becomes "10011000".

The signal sequences corresponding to the bit positions of the bit-converted identification code at which the bit value is 1 are searched from a previously prepared correspondence table (step 403).

Figure 6:
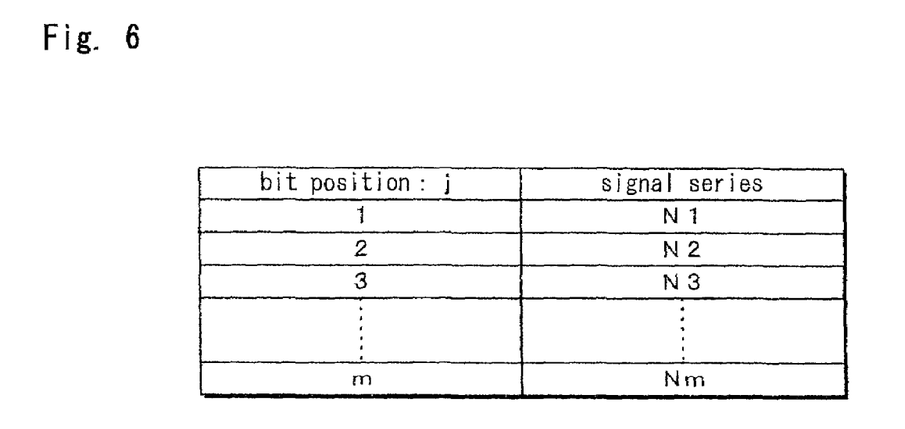
FIG. 6 is an example diagram of a correspondence table of the identification code bit positions and signal sequences of the invention.
Figure 7:
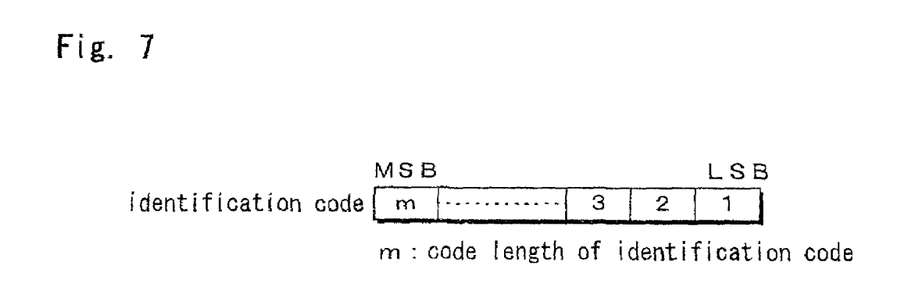
FIG. 7 is an explanatory diagram of the identification code bit positions of the invention.

FIG. 6 shows a correspondence table of the identification code bit positions and the signal sequences. FIG. 7 shows the identification code bit positions.

With the bit-string-converted identification code, "10011000", since the 4th bit, 5th bit, and 8th bit (reading from right to left) from the LSB take on a value of "1", the three signal sequences {N4, N5, N8} are found to correspond to the bit positions with a value of "1" by use of the correspondence table. Identification code generating unit 103 sends these signal sequences to digital watermark embedding unit 104 (step 404).

Although the identification code was converted to binary form in converting the identification code into a bit string, the method of conversion to a bit string is not limited thereto. For example, a code table for the ASCII code, etc. may be used instead.

Also, although signal sequences were prepared from bit positions of value "1" in the search for signal sequences from the correspondence table, the signal sequences may be prepared from bit positions of value "0" instead.

Figure 8:
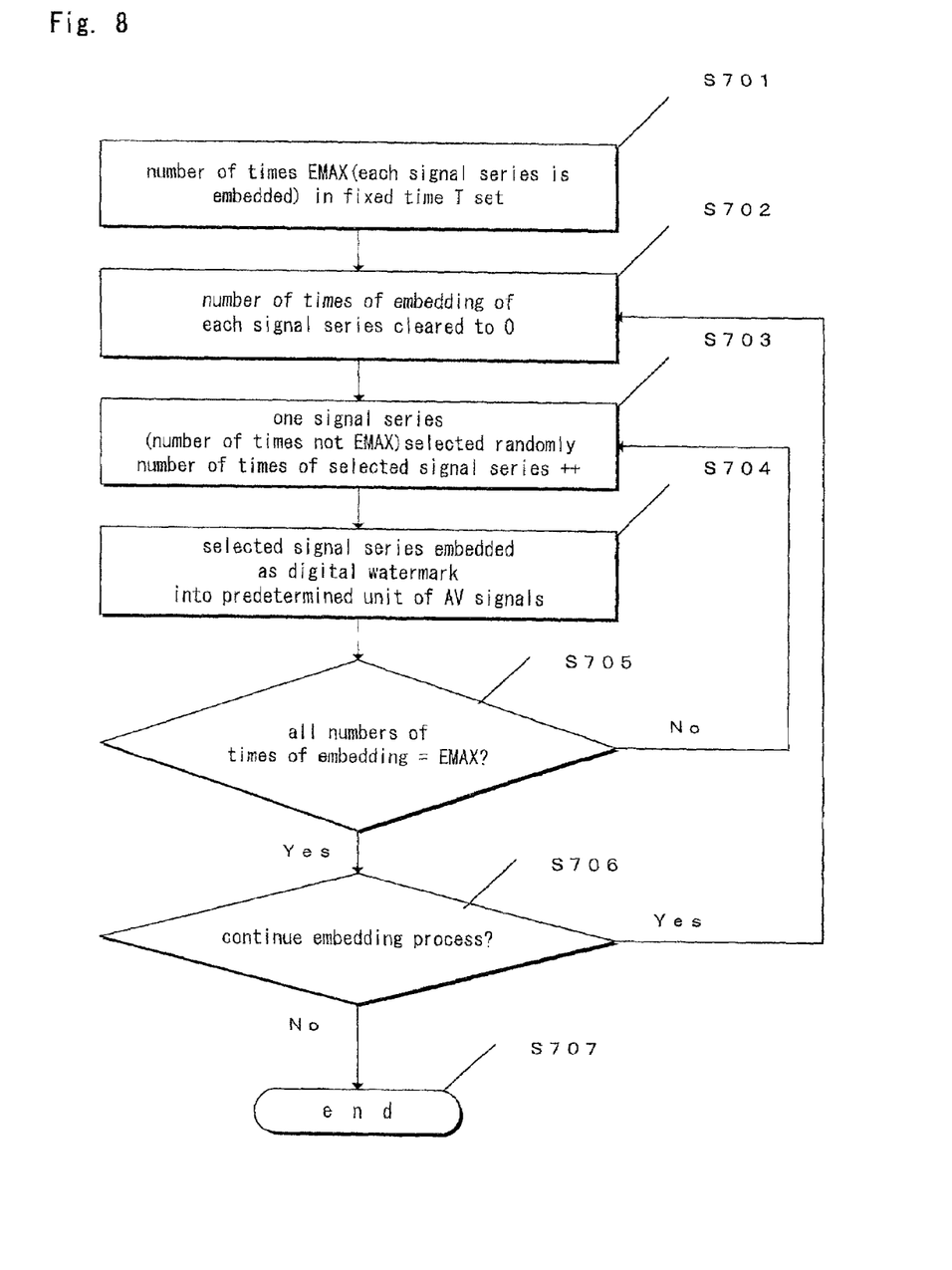
FIG. 8 is a flowchart for the digital watermark embedding unit of the invention.

The process of digital watermark embedding unit 104 (step 304) is now described with reference to the flowchart of FIG. 8, which shows the flow of the process digital watermark embedding unit 104. Digital watermark embedding unit 104 embeds the plurality of signal sequences input from identification code generating unit 103 at the same proportion per fixed time T. This is done since the signal sequences can then be taken out conveniently at fixed proportions when AV signals of a fixed time T are taken out.

That is, the number of times EMAX by which each signal sequences is embedded in a fixed time T is set (step 701) and the number of times of embedding of each signal sequences is cleared to 0 (step 702).

One signal sequences is then selected randomly from among the signal sequences for which the number of times of embedding is not EMAX and the number of times of embedding of that signal sequences is incremented (step 703).

The selected signal sequence is then embedded as a digital watermark by a previously used method into a predetermined unit of the AV signals input from decoding unit 102 (step 704).

The processes from the selection of signal sequences of step 703 are then repeated until the number of times of embedding equals EMAX for all signal sequences. Then the next process is entered (step 705).

If the embedding process of step 703 to step 705 is to be repeated further, the process is repeated from the clearing of the number of times of embedding of step 702, otherwise the embedding process is ended (step 706).

Output unit 105 then outputs the AV signals, in which the identification code has been embedded as the digital watermark by digital watermark embedding unit 104, to a monitor, speaker, recording equipment, network, etc. (step 305).

Figure 9:
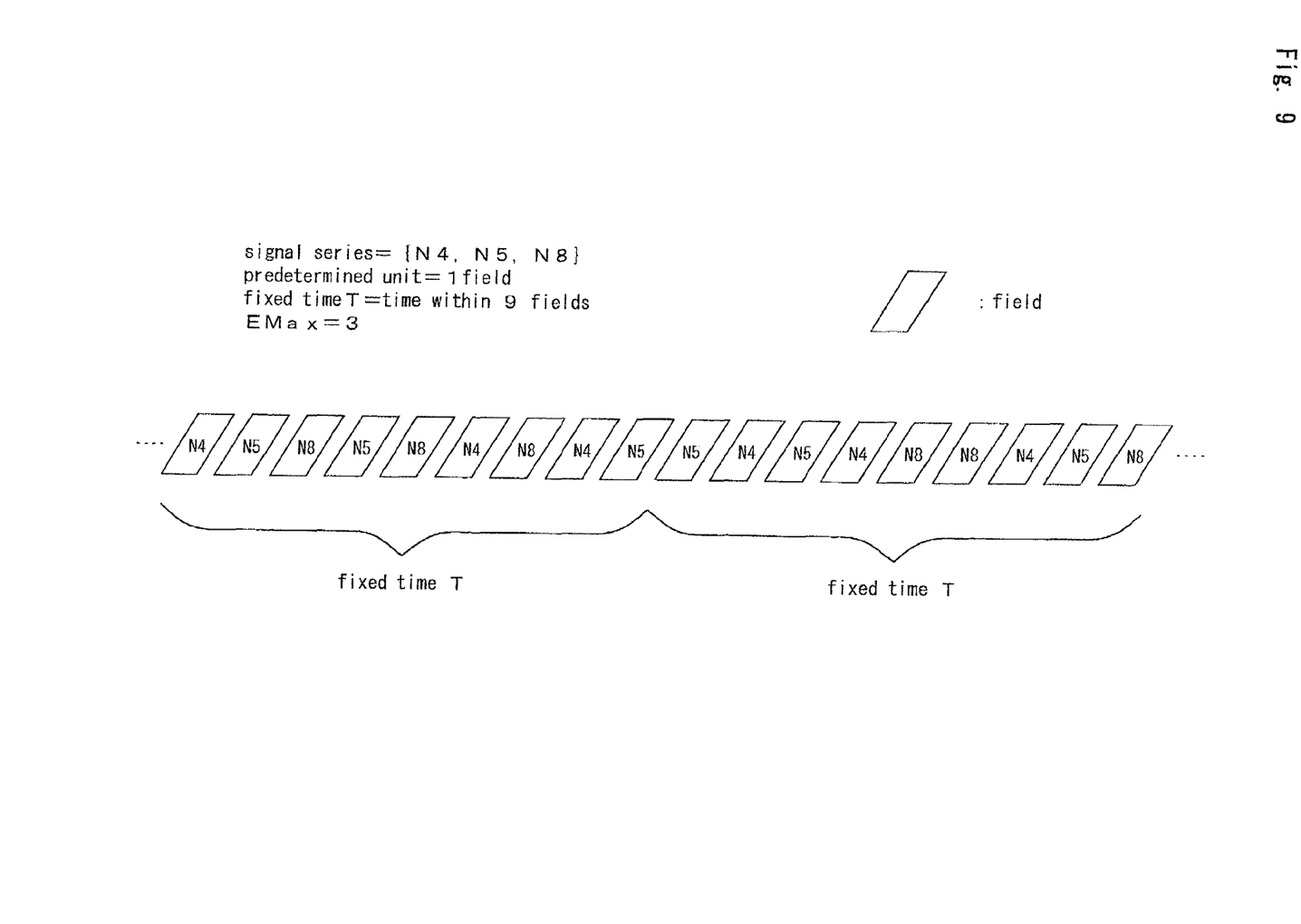
FIG. 9 is an explanatory diagram which shows an example of embedding signal sequences in video signals by the invention.

Referring now to FIG. 9, an example is shown in which the signal sequences have been embedded in video signals. With this example, the embedded signal sequences are {N4, N5, N8}, the unit of the video signals in which one signal sequences is embedded (the abovementioned predetermined unit) is 1 field, the fixed time T in which the proportions of the respective signal sequences are made the same is set to 9 fields, and each signal sequences is embedded 3 times within the 9 fields.

Although one signal sequences is embedded within 1 field as the predetermined unit in this example, the predetermined unit may be set to 1 frame or the predetermined unit may be set to several fields or several frames.

Figure 10:
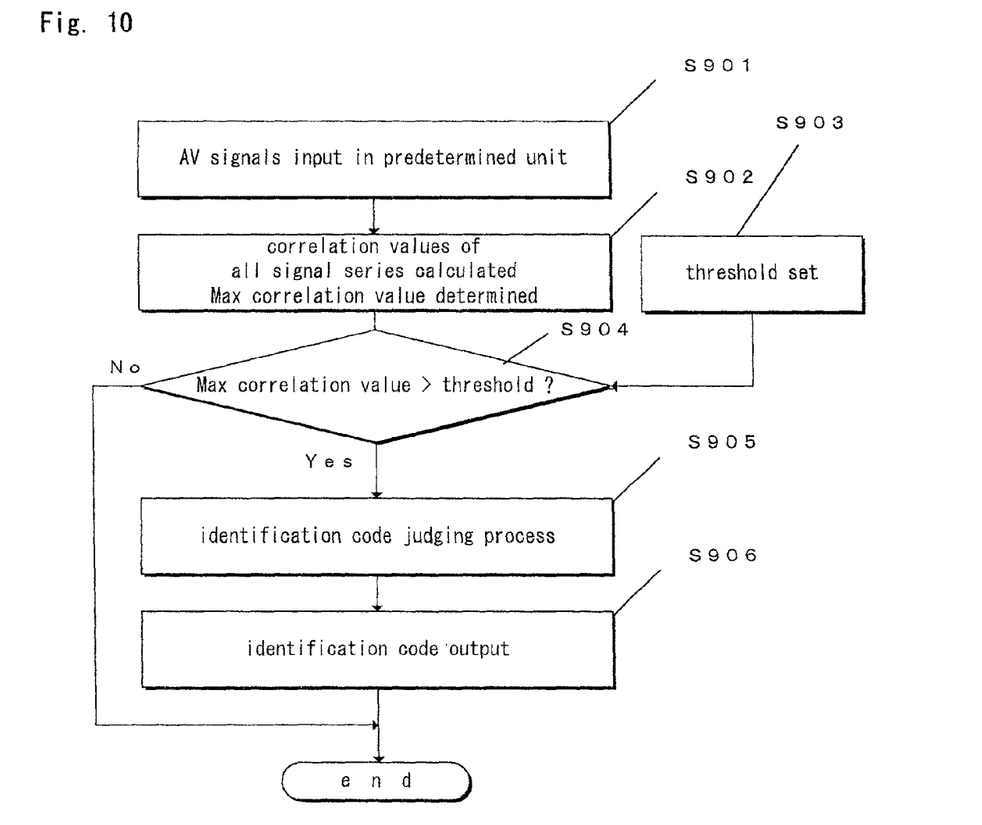
FIG. 10 is a flowchart for the reproduction equipment specifying equipment of the invention.

Referring now to the flowchart of FIG. 10, the reproduction equipment specifying method, by which the identification code is extracted from the AV signals, in which the identification code was embedded as the digital watermark, and the reproduction equipment is specified, is shown. FIG. 10 illustrates the process performed by the reproduction equipment specifying equipment of FIG. 3.

Input unit 201 sends the input AV signals to correlation value calculation unit 203 upon dividing the signals into the predetermined units, in each of which is embedded one signal sequences (step 901). Signal sequences recording unit 202 has recorded therein a correspondence table of identification code bit positions and signal sequences of the same contents as that used in the reproduction equipment.

Correlation value calculation unit 203 determines the correlation values of all signal sequences and the AV signals input from input unit 201 and determines the maximum correlation value from these correlation values (step 902). The maximum correlation value and the bit position corresponding to the signal sequences for which the maximum correlation value was extracted are then sent to comparison unit 205.

Figure 5:
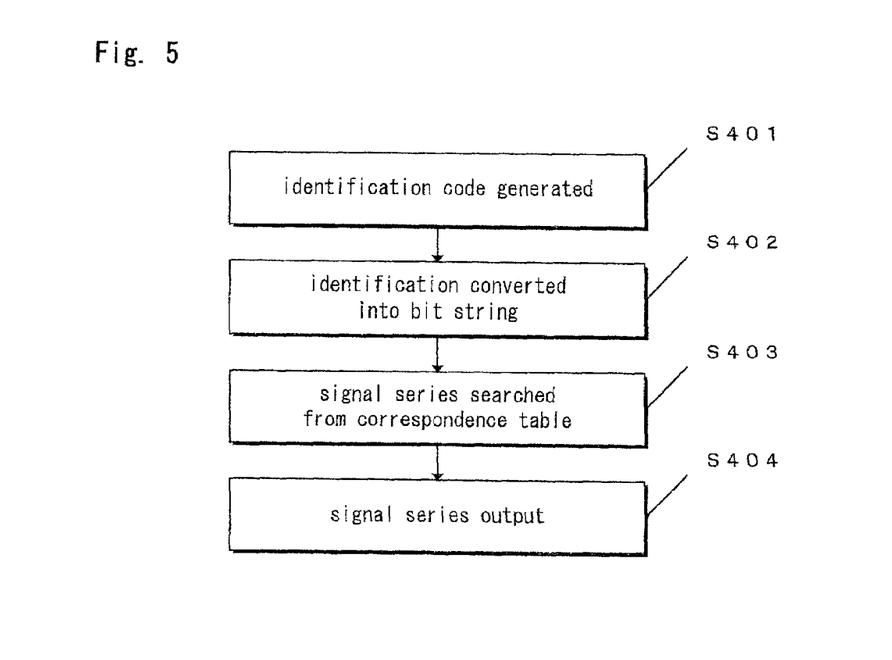
FIG. 5 is a flowchart for the identification code generating unit of the invention.

For example, when the correspondence table of FIG. 5 is used, correlation value calculation unit 203 determines the correlation values of the m signal sequences {N1, N2, . . . Nm} and the AV signals and determines the maximum correlation value from among these correlation values. If the maximum correlation value SMAX is obtained for the correlation with the signal sequence {N4}, this maximum correlation value SMAX and the bit position {4} that corresponds to signal sequence {N4} are sent to comparison unit 205.

Threshold value setting unit 204 then sets a threshold value for the correlation value of comparison unit 205 (step 903). Comparison unit 205 compares the maximum correlation value with the threshold value (step 904) and, if the correlation value exceeds the threshold value, sends the bit position corresponding to the signal sequences for which this correlation value was extracted to identification code judgment unit 206. If the maximum correlation value is less than or equal to the threshold value, the bit positions are not sent.

When a disturbance occurs due to illegal copying, etc., a correlation value greater than the threshold value may not exist at all or a plurality of correlation values greater than the threshold value may exist. In such a case, comparison unit 205 may be programmed to not compare the threshold value and the correlation value but perform, as an exceptional process, the extraction of the bit position of a signal sequence with a maximum correlation value S1 only in the case where the maximum correlation value S1 satisfies a certain condition with respect to the other correlation values Sn (for example, the condition S1>Sn).

Figure 11:
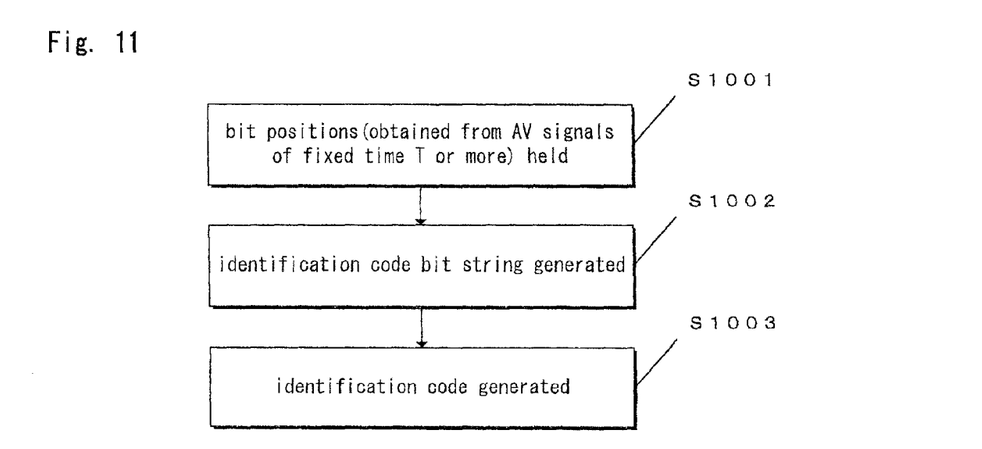
FIG. 11 is a flowchart for the identification code judgment unit of the invention.

The process of identification code judgment unit 206 (step 905) is now described in detail with reference to the flowchart of FIG. 11 which shows the flow of the process of identification code judgment unit 206.

Identification code judgment unit 206 holds a plurality of bit positions that were obtained by determining the correlation with a plurality of signal sequences obtained from AV signals of a fixed time T or more using at least the reproduction equipment (step 1001). An identification code bit string is then generated from the plurality of bit positions (step 1002). An identification code is generated from the bit string (step 1003).

The interpretation and method of bit string preparation and identification code generation are the same as those for the reproduction equipment. For example, if the plurality of bit positions obtained from an AV signal of a fixed time T is {4, 5, 8}, since signal sequences are embedded at bit positions corresponding to the "1"'s in the identification code bit string by the reproduction equipment, the bit string, "10011000", will be obtained.

Also, since decimal to binary conversion is used in the generation of the bit string at the reproduction equipment, the identification code, "152", will be obtained from the bit string, "10011000".

Identification code output part 207 then outputs the identification code extracted by identification code judgment unit 206 (step 906).

Also in accordance with a correspondence table changing signal, the identification code generating unit 103 of the reproduction equipment and the signal sequence recording unit 202 of the reproduction equipment specifying equipment can change the contents of the correspondence tables held. Such a change of the correspondence tables can be accomplished by any method. Several correspondence tables may be held in advance in each of identification code generating unit 103 and signal sequence recording unit 202. These correspondence tables may be interchanged, or a new correspondence table may be input from the exterior.

The changes of the correspondence tables in identification code generating unit 103 and signal sequence recording unit 202 are made simultaneously so as to make agreement between their contents.

Thus even for the same identification code, different signal sequences can be embedded as the digital watermark in the AV signals at the reproduction equipment. The reproduction equipment specifying equipment can thus be made to extract the embedded identification code correctly.

Also, as the plurality of signal sequences used in the correspondence tables in the identification code generating unit 103 of the reproduction equipment and the signal sequence recording unit 202 of the reproduction equipment specifying equipment, signal sequence are used with which the cross correlation will be smaller than a previously set value (threshold value of cross correlation). By selecting a signal sequence in which the cross correlation is smaller, the precision of extraction of the embedded signal sequences can be improved and the precision of extraction of the identification code can be improved. Preferably, a PN code, M-sequence code, or Gold code is used.

As has been described above, with the reproduction equipment of the present embodiment, the decoding of coded AV signals is performed, an identification code is converted into a plurality of signal sequences using a correspondence table, and the plurality of signal sequences thus obtained are embedded as a digital watermark at the same proportion per fixed time T.

Meanwhile, with the reproduction equipment specifying equipment, the correlation values of the AV signals in which the digital watermark was embedded and signal sequences contained in the correspondence table are determined and compared with a previously set threshold value to determine the validity of the embedded signal sequences.

The identification code of the reproduction equipment is then extracted from the plurality of signal sequences obtained from AV signals of a fixed time T or more.

Furthermore, the correspondence tables in the reproduction equipment and the reproduction equipment specifying equipment are changed simultaneously to the same contents. The signal sequences to be embedded can thus be changed even for the same identification code.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A reproduction equipment comprising:
a coded signal input unit operable to input coded AV ("audio, video, or audio video") signals;
a decoding unit operable to decode the coded AV signals inputted from said coded signal input unit, and further operable to generate AV signals to be reproduced;
an identification code generating unit operable to generate an identification code specifying the reproduction equipment;
a digital watermark embedding unit operable to input the AV signals to be reproduced from said decoding unit to embed the identification code generated by said identification code generating unit as a digital watermark into said AV signals to be reproduced, wherein a digital watermark embedded signal is generated;
an output unit operable to output the digital watermark embedded AV signals; and
said identification code generation unit is further operable to convert the identification code into a binary bit string, each position of a specific value bit of the binary bit string indicating a corresponding signal sequence among a plurality of signal sequences, and still further operable to output the binary bit string as an output of said identification code generating unit;
wherein an output of said identification code generating unit is composed of a binary bit string indicating a corresponding signal sequence among a plurality of signal sequences.

2. A reproduction equipment as set forth in claim 1, wherein said identification code is at least one of an equipment ID of said reproduction equipment, a card ID of an IC card connected to said reproduction equipment, a user ID of a user of the reproduction equipment, a raw material ID of said coded AV signals, a medium ID of a recording medium in which said coded AV signals are stored, a reproduction date and time, and an initial value of a signal sequence to be embedded among the plurality of the signal sequences as said digital watermark.

3. A reproduction equipment as set forth in claim 1, wherein said identification code generating unit is further operable to convert the identification code into the binary bit string utilizing a table of correspondence of at least one of character strings and numbers that express identification codes, and a corresponding signal sequence among the plurality of said signal sequences.

4. A reproduction equipment as set forth in claim 3, wherein said digital watermark embedding unit embeds a different signal sequence in each of a predetermined unit of said AV signals to be reproduced.

5. A reproduction equipment as set forth in claim 4, wherein said digital watermark embedding unit embeds a plurality of signal sequences, to be embedded as the digital watermark, randomly at a same proportion per fixed time in said AV signals to be reproduced.

6. A reproduction equipment as set forth in claim 1, wherein said plurality of signal sequences are signal sequences with which cross correlation values are smaller than a previously set threshold value.

7. The reproduction equipment as set forth in claim 1, further comprising a unit operable to record a copy of said digital watermark-embedded AV signals.

8. A reproduction equipment specifying equipment comprising:
an input unit operable to input AV signals containing a binary bit string, each position of a specific value bit of the binary bit string indicating a corresponding signal sequence among a plurality of signal sequences of the same contents as that of a reproduction equipment, the binary bit string being embedded in the AV signals as a digital watermark;
a signal sequences recording unit operable to record the plurality of signal sequences;
a correlation value calculation unit operable to calculate correlation values of the AV signals and all of said signal sequences recorded by said signal sequence recording unit and further operable to output a maximum correlation value among correlation values obtained;
a threshold value setting unit operable to set a threshold value for said correlation values;
a comparison unit operable to compare said maximum correlation value with said threshold, and further operable to output a one of said plurality of signal sequences for which said maximum correlation value exceeds said threshold value;
an identification code judgment unit operable to determine an identification code in accordance to the one of said signal sequences output from said comparison unit; and
an identification code output unit operable to output said identification code.

9. A reproduction method, comprising;
inputting coded AV signals;
decoding said coded AV signals to generate coded AV signals to be reproduced;
generating an identification code;
converting the identification code into a binary bit string, each position of a specific value bit of the binary bit string indicating a corresponding signal sequence among a plurality of signal sequences;
embedding the binary bit string as a digital watermark into said AV signals to be reproduced, wherein digital watermark-embedded AV signals are generated; and
outputting said digital watermark-embedded AV signals.

10. A reproduction method as set forth in claim 9, wherein said identification code is at least one of an equipment ID of a reproduction equipment, a card ID of an IC card connected to said reproduction equipment, a user ID of a user of the reproduction equipment, a raw material ID of said coded AV signals, a medium ID of a recording medium in which said coded AV signals are stored, a reproduction date and time, and an initial value of a signal sequence to be embedded among the plurality of signal sequences as said digital watermark.

11. A reproduction method as set forth in claim 9, wherein the plurality of signal sequences are signal sequences having cross correlation values that are smaller than a previously set threshold value.

12. A reproduction method as set forth in claim 9, wherein the step of embedding includes embedding a different signal sequence in each of a predetermined unit of the AV signals to be reproduced.

13. A reproduction method as set forth in claim 12, wherein the step of embedding includes embedding said plurality of signal sequences randomly at the same proportions per fixed time in said AV signals to be reproduced.

14. A recording medium, in which watermark-embedded AV signals are recorded by the reproduction method of claim 9.

15. A reproduction equipment specifying method, comprising:
    inputting AV signals containing a binary bit string, each position of a specific value bit of the binary bit string indicating a corresponding signal sequence among a plurality of signal sequences of the same contents as that of a reproduction equipment, the binary bit string being embedded in the AV signals as a digital watermark;
    recording the plurality of signal sequences;
    calculating correlation values of the input AV signals and all of the plurality of signal sequences to output a maximum correlation value among said correlation values obtained;
    setting a threshold value for said correlation values;
    comparing said maximum correlation value with said threshold value to output a one of said plurality of signal sequences for which said maximum correlation value exceeds said threshold value;
    determining an identification code in accordance with said one of said signal sequences; and
    outputting said identification code.

16. A medium, in which a reproduction equipment specifying program is recorded, comprising:
    inputting AV signals containing a binary bit string, each position of a specific value bit of the binary bit string indicating a corresponding signal sequence among a plurality of signal sequences of the same contents as that of a reproduction equipment, the binary bit string being embedded in the AV signals as a digital watermark;
    recording the plurality of signal sequences;
    calculating correlation values of the input AV signals and all of the plurality of signal sequences to output a maximum correlation value among said correlation values obtained;
    setting a threshold value for said correlation values;
    comparing said maximum correlation value with the threshold value to output a one of the plurality of signal sequence for which said maximum correlation value exceeds said threshold value;
    determining an identification code in accordance with said one of the signal sequences and said correspondence table; and
    outputting said identification code.

* * * * *

UNITED STATES PATENT AND TRADEMARK OFFICE
CERTIFICATE OF CORRECTION

PATENT NO. : 7,142,692 B2  Page 1 of 1
APPLICATION NO. : 09/941931
DATED : November 28, 2006
INVENTOR(S) : Koji Arimura et al.

It is certified that error appears in the above-identified patent and that said Letters Patent is hereby corrected as shown below:

Column 3; Line 56; Delete "used-in" and insert -- used in --, therefor.

Column 5; Line 53 (Approx.); After "medium" delete "I" and insert -- 1 --, therefor.

Column 7; Line 46; After "table" insert -- . --.

Column 12; Line 2; In Claim 3, delete "said" before "signal".

Column 14; Line 9; In Claim 16, insert -- computer readable -- before "medium,".

Signed and Sealed this

Twenty-second Day of May, 2007

JON W. DUDAS
*Director of the United States Patent and Trademark Office*